(12) United States Patent
Shimoda et al.

(10) Patent No.: US 6,412,760 B2
(45) Date of Patent: Jul. 2, 2002

(54) LIQUID-FILLED TYPE VIBRATION ISOLATOR

(75) Inventors: Yoshiki Shimoda; Tetsuo Asano, both of Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/748,238

(22) Filed: Dec. 27, 2000

(30) Foreign Application Priority Data

Dec. 27, 1999 (JP) .......................................... 11-368913

(51) Int. Cl.[7] .............................. F16F 13/00; F16F 5/00
(52) U.S. Cl. ................ 267/140.13; 267/219; 267/64.14
(58) Field of Search .................... 267/140.13, 140.14, 267/64.14, 219–220; 248/636, 562, 638; 180/312, 300, 902

(56) References Cited

U.S. PATENT DOCUMENTS 5,170,998 A * 12/1992 Muramatsu ............ 267/140.13
5,215,293 A * 6/1993 Muramatsu et al. ... 267/140.14
6,082,718 A * 7/2000 Yamada et al. ........ 267/140.14

FOREIGN PATENT DOCUMENTS

JP   5-272575   10/1993

* cited by examiner

Primary Examiner—Douglas C. Butler
(74) Attorney, Agent, or Firm—Pillsbury Winthrop LLP

(57) ABSTRACT

A liquid-filled type vibration isolator, having a vibration isolation mechanism, formed between first and second coupling members to be mounted to a vehicle body-side member, including: a rubber-like insulator for absorbing and isolating vibrations from the vibration member; a main chamber, whose chamber walls are formed by a portion of the insulator, and which is filled with liquid; a sub-chamber, whose chamber walls are partially formed by a first diaphragm, coupled to the main chamber through a first orifice; a partitioning member for partitioning between the main chamber and the sub-chamber; a second diaphragm for partitioning between a third liquid chamber to be coupled to the main chamber through a second orifice, and a balance chamber into which negative pressure is introduced.

19 Claims, 6 Drawing Sheets

LIQUID-FILLED TYPE VIBRATION ISOLATOR

FIELD OF THE INVENTION

The present invention relates to a liquid-filled type vibration isolator having a vibration isolation mechanism formed so as to isolate vibrations in a specific frequency area, and more particularly to a liquid-filled type vibration isolator in which an orifice for isolating vibrations between two frequency areas such as, for example, between engine idling vibrations and engine shakes is provided at a partition member for partitioning between the main chamber and the sub-chamber.

BACKGROUND OF THE INVENTION

Of the vibration isolators, particularly an automotive engine mount or the like must be able to cope with a wide range of frequencies because an engine, which is a power source, is used under various conditions from an idling operating state to the maximum rotating speed. Therefore, there has been devised a liquid-filled type vibration isolator having a vibration isolation mechanism, in which there are provided two liquid chambers within, those liquid chambers are coupled through an orifice and liquid in the liquid chambers is caused to be vibrated at a specific frequency, and has been known already. Of such liquid-filled type vibration isolators, as a type having two orifices, there are an invention disclosed in JP-A-5-272575 specification, or the like.

Then of vibration isolators of the type having two orifices including the above described conventional one, as the negative pressure introduction type liquid-filled type vibration isolator as shown in, for example, in FIG. 5, there is a vibration isolator configured by: a rubber-like insulator 10 integrally having a first coupling member 90 to be coupled to the vibration member side such as the engine, or the like; a member 20 having an adjustment orifice 210, for partitioning between the main chamber and a third liquid chamber; a second diaphragm 30 for partitioning and forming a portion of a balance chamber 330, in which negative pressure is to be introduced, and which operates by the introduction of negative pressure; a partitioning chamber 40 for contributing to the formation of the above described balance chamber 330, made of a rigid-like member; a diaphragm 50 provided below the partitioning member concerned 40, for contributing to the formation of the sub-chamber; or the like. Each of these components is integrally assembled as shown in FIG. 5 to thereby form a liquid-filled type vibration isolator.

SUMMARY OF THE INVENTION

Therefore, components (members), each having a complicated shape, including a member 20 having an adjustment orifice 210 or the like are required, and it is inevitable that the cost will be entirely increased. In order to solve these problems, a plurality of functional units including the above described two orifices are arranged to be brought together at partitioning members to be formed by castings made of aluminum alloy. Thus, it is an object according to the present invention to provide a liquid-filled type vibration isolator of the type having two orifices capable of reducing the manufacturing cost as a whole by simplifying the structure of the other components.

That is, according to the invention as specified in claim 1, there is provided a liquid-filled type vibration isolator of a type having two orifices, comprises: a first coupling member to be mounted to a vibration member; a second coupling member to be mounted to a vehicle body-side member or the like; a rubber-like insulator interposed between these first and second coupling members, for absorbing and isolating vibrations from the vibration member; a main chamber, whose chamber walls are formed by a portion of the insulator concerned, and which is filled with liquid; a sub-chamber, whose chamber walls are partially partitioned and formed by the first diaphragm, coupled to the main chamber concerned through the first orifice; a partitioning member for partitioning between the main chamber and the sub-chamber; a second orifice for coupling the main chamber to a third liquid chamber; or the like, wherein the above described partitioning member is configured such that it has a cylindrical shape, has the first and second orifices on the peripheral edge portion thereof, has, on the upper portion side, an opening to be formed independently of the first and second orifices, has a recess, whose bottom portion forms a partition with the sub-chamber, and further has, on its lower portion side, an opening of the first orifice connected to the sub-chamber. With such a configuration, a vibration isolator according to the present invention is to be formed in a state in which each functional unit including two orifices is integrally brought together at the above described partitioning member. Therefore, with such a partitioning member as a basis, an insulator made of a rubber-like member, various diaphragms or the like is installed around the partitioning member, whereby it becomes possible to comparatively simply form a liquid-filled type vibration isolator of the type having two orifices.

Next, the present invention is characterized by the configuration of the third liquid chamber. That is, according to the present invention, there is provided the above described liquid-filled type vibration isolator configured such that within the recess of the partitioning member, there is provided the second diaphragm, which forms a portion of the third liquid chamber, and on the upper portion side where the second diaphragm has been provided, there is provided a lid member, which forms a portion of the third liquid chamber and partitions with the main chamber, thereby the third liquid chamber is integrally formed with the partitioning member as the basis.

With such a configuration, in a vibration isolator according to the present invention, the upper opening of the partitioning member will be blocked up by a simple lid member, thereby it becomes possible to form the third liquid chamber and to integrally form the vibration isolation mechanism of the type having two orifices around the partitioning member.

Next, the present invention is characterized by the configuration of the adjustment orifice, which is the second orifice to be provided between the main chamber and the third liquid chamber. That is, according to the present invention, there is provided a liquid-filled type vibration isolator configured such that within the recess of the partitioning member, there is provided the second diaphragm, which forms a portion of the third liquid chamber; and on the upper portion side where the second diaphragm has been provided, there is provided a lid member, which forms a portion of the third liquid chamber and partitions with the main chamber, whereby a vibration isolation mechanism consisting of the second diaphragm, the third liquid chamber for adjusting the liquid pressure within the main chamber by the operation of the second diaphragm, the second orifice or the like is caused to be integrally formed with the partitioning member as the basis. With such a configuration, in a vibration isolator according to the present invention, the second orifice is formed, and the adjustment orifice, which functions mainly at the input of idling vibrations, is to be provided at the above described partitioning member. Therefore, there is no need for the provision as a separate component unlike a conventional one, but it becomes possible to reduce the manufacturing cost as a whole. In other words, the upper opening of the partitioning member will be blocked up by a simple lid member, whereby it becomes possible to integrally form the vibration isolation mechanism including the third liquid chamber around the partitioning member.

Further, the present invention is characterized by the shape of each orifice. That is, according to the present invention, there is provided a liquid-filled type vibration isolator configured such that the second and first orifices are provided in series to the main chamber. With such a configuration, it becomes possible to sufficiently secure the effective length of the orifice aimed at vibration damping of engine shakes, thus making it possible to secure sufficient damping characteristics.

In addition, the present invention is characterized by the shape of each orifice. That is, according to the present invention, there is provided a liquid-filled type vibration isolator configured such that the first orifice and the second orifice are provided in parallel to the main chamber. With such a configuration, a vibration isolator according to the present invention will be able to effectively damp idling vibrations and vibrations due to engine shakes.

DETAILED DESCRIPTION OF THE INVENTION

Figure 1:
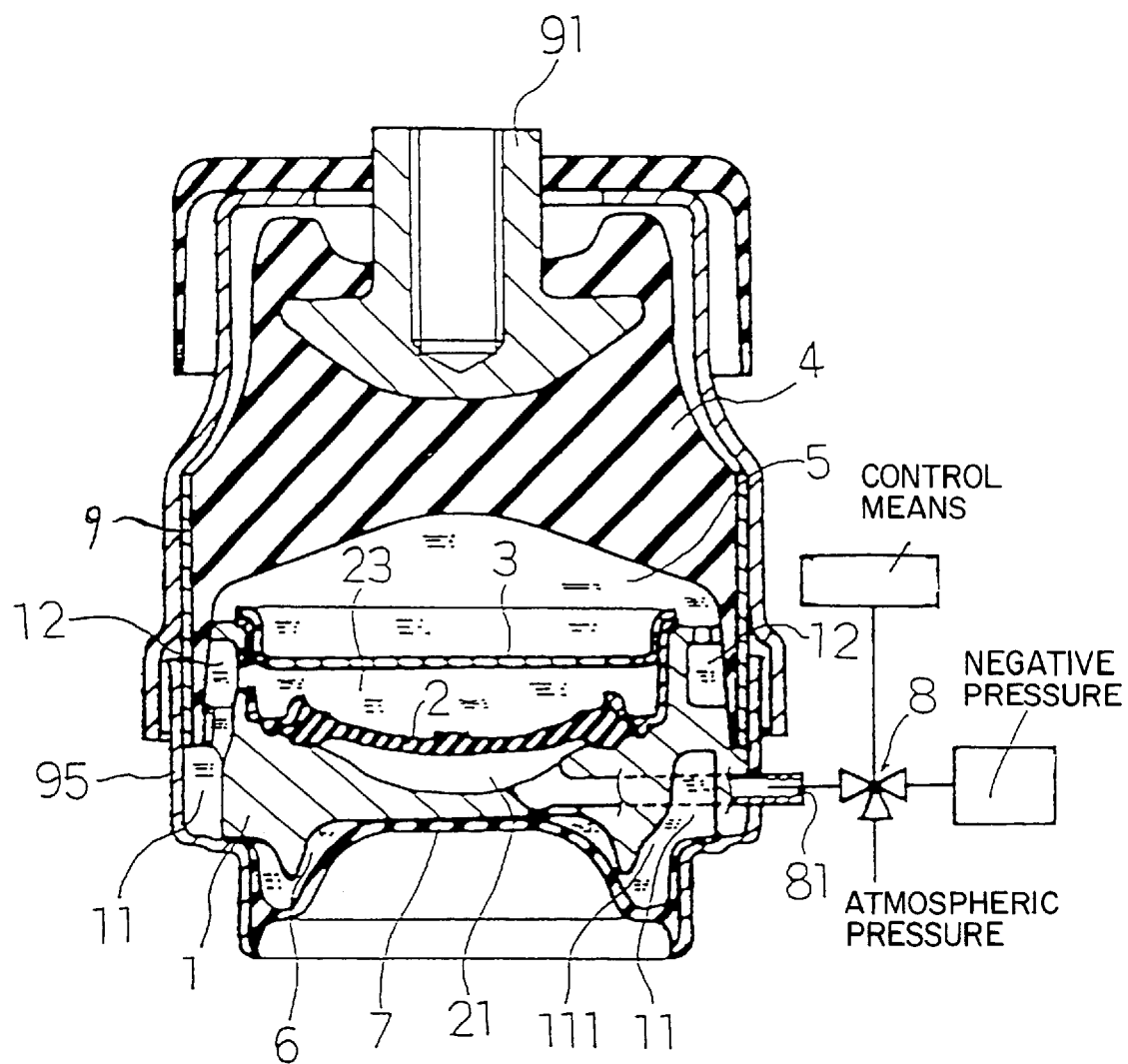
FIG. 1 is a longitudinal sectional view showing the general configuration according to the present invention.

With reference to FIGS. 1 to 6, the description will be made of embodiments according to the present invention. A vibration isolator according to the present embodiment is, basically as shown in FIG. 1, configured by: a first coupling member 91 to be mounted to a vibration member; a second coupling member 9 to be mounted to a vehicle body-side member or the like; a rubber-like insulator 4, interposed between these first coupling member 91 and second coupling member 95, for absorbing and isolating vibrations from the vibration member; a main chamber 5, whose chamber walls are formed by a portion of the insulator 4 concerned, and which is filled with liquid; a sub-chamber 6, whose chamber walls are partially partitioned and formed by a first diaphragm 7, coupled to the main chamber 5 concerned through a first orifice 11; a partitioning member 1 for partitioning between the main chamber 5 and the sub-chamber 6; a second diaphragm 2 for partitioning between a third liquid chamber 23 to be coupled to the main chamber 5 through a second orifice 12 and a balance chamber 21, into which negative pressure is appropriately introduced by the operation of switching means 8; and a lid member 3 provided in an upper portion of the partitioning member 1, for partitioning between the main chamber 5 and the third liquid chamber 23.

Figure 2:
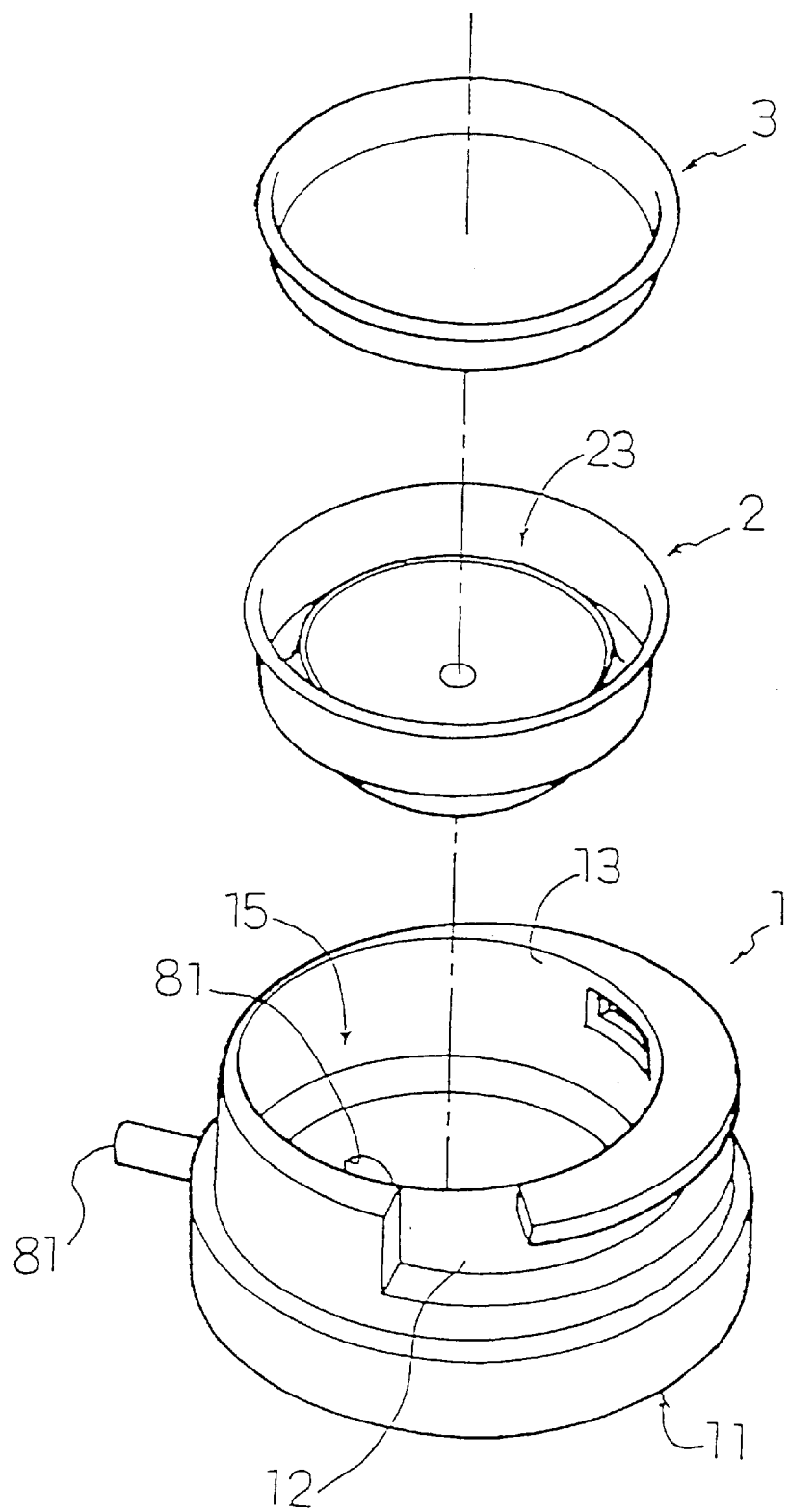
FIG. 2 is a developed perspective view showing the configuration of surroundings of a partitioning member which configures a major portion of the present invention.
Figure 3:
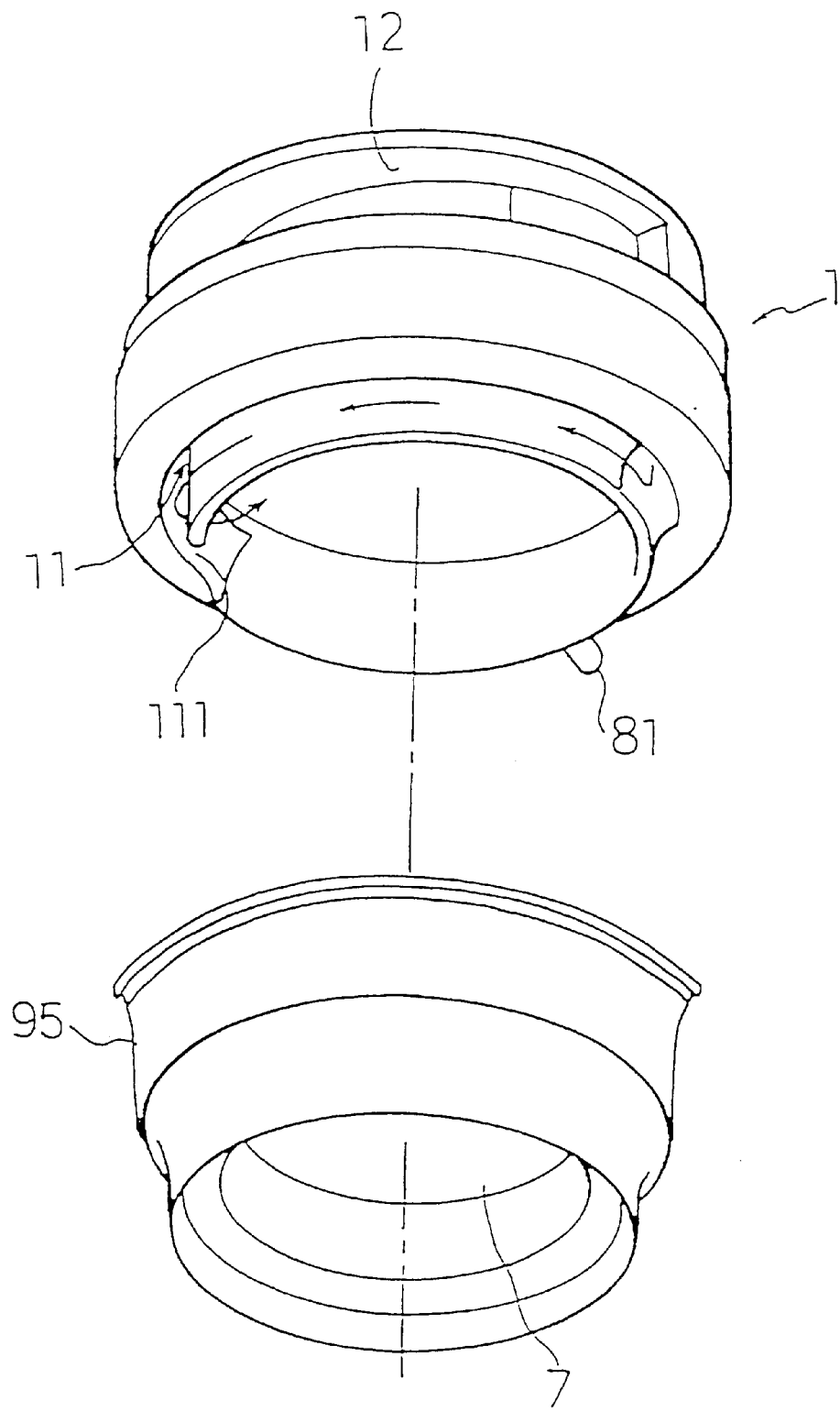
FIG. 3 is a developed perspective view showing relationship between the partitioning member which configures the major portion of the present invention and a first diaphragm.

In a vibration isolator having such a basic configuration, the partitioning member 1 is basically formed of a casting member made of aluminum alloy, and has basically a cylindrical shape as shown in FIGS. 2 and 3. On the peripheral edge portion thereof, there is provided the second orifice 12 having an opening to the main chamber 5, and subsequently thereto, there is provided the first orifice 11, whose one end portion has an opening 111 to the sub-chamber 6. Further, on the upper portion side, there is provided a recess 15, which is separately formed independently of the first orifice 11 and the second orifice 12, and which has a circular opening 13 having the center point at a position shifted by a predetermined amount from center points of circles of these circular orifices 11 and 12. The bottom portion of such a recess 15 forms a portion of the balance chamber 21, and forms a partition with the sub-chamber 6.

In a vibration isolator having such a configuration, concretely as shown in FIG. 2, on the upper portion side, there is provided an opening 13 in the recess 15, and within such a recess 15, there is provided the second diaphragm 2 for forming a portion of the balance chamber 21, and on the upper portion side, on which the second diaphragm 2 has been provided, there is provided the lid member 3, which forms the third liquid chamber 23 and partitions with the main chamber 5 (See FIGS. 1 and 2). Thus, when negative pressure is introduced into the balance chamber 21 through switching means 8 and a communicating path 81, the second diaphragm 2 operates and the liquid within the main chamber 5 is to be excited through the third liquid chamber 23 and the second orifice 12 by the operation of the second diaphragm 2 concerned. On the lower portion side of the partitioning member 1, as shown in FIGS. 1 and 3, there is to be provided a sub-chamber side opening 111 of the first orifice 11 connected to the sub-chamber 6. At the lower end of the partitioning member 1, the first diaphragm 7 is mounted, whereby there will be formed a sub-chamber 6 for communicating to the main chamber 5 through the orifices 11 and 12.

Around the cylindrical partitioning member 1 having the configuration, the second diaphragm 2 and the lid member 3 are mounted from the upper portion side as shown in FIG. 2, whereby there will be formed a subassembly having the balance chamber 21, the third liquid chamber 23 or the like. Thus, with such a subassembly as the center, the rubber-like insulator 4 made integral with the first coupling member 91, the first diaphragm 7 (See FIG. 3) made integral with a first diaphragm fixing member 95 or the like are integrally assembled within a container filled with predetermined liquid or the like, whereby there will be formed a liquid-filled type vibration isolator having a negative pressure introduction type vibration isolation mechanism.

Figure 4:
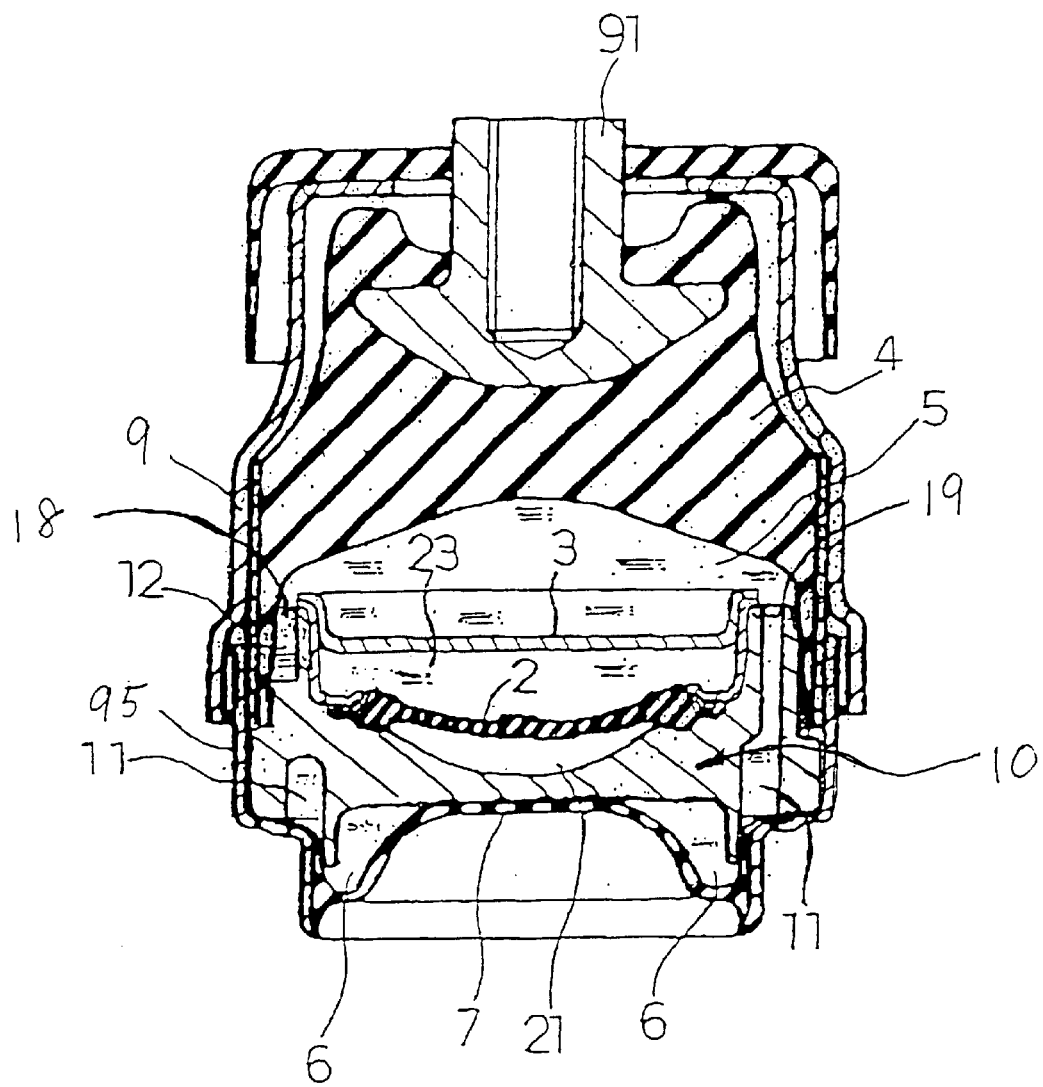
FIG. 4 is a longitudinal sectional view showing another embodiment according to the present invention.
Figure 5:
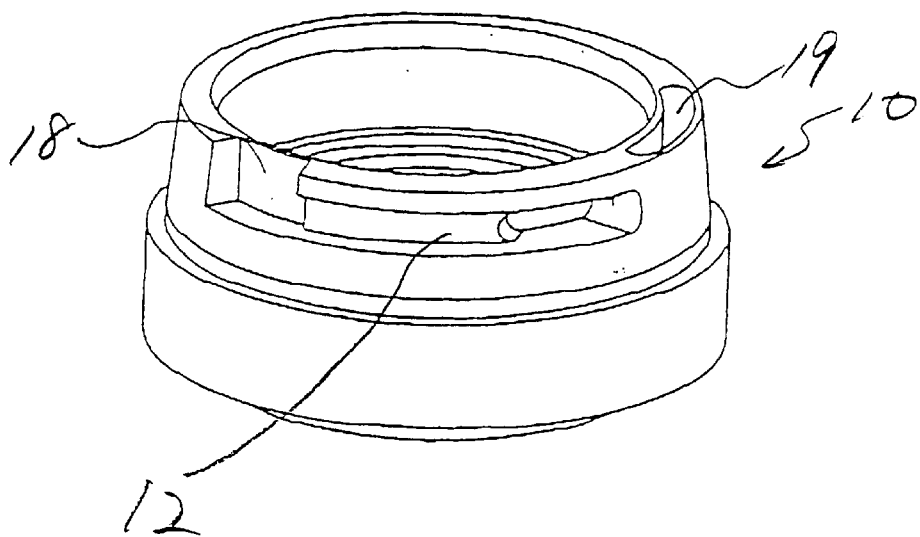
FIGS. 5 and 6 are perspective views of a partitioning member of FIG. 4.
Figure 6:
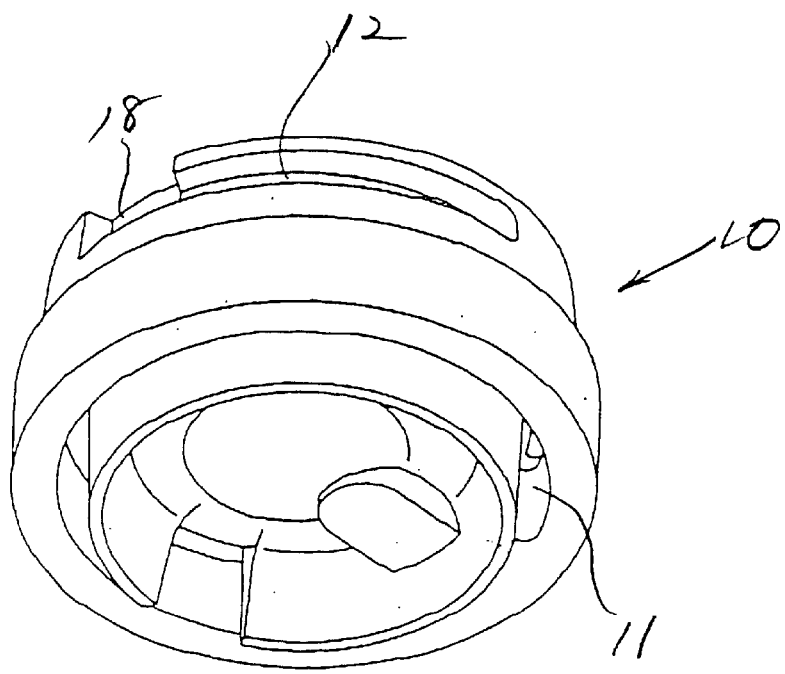
Figure 7:
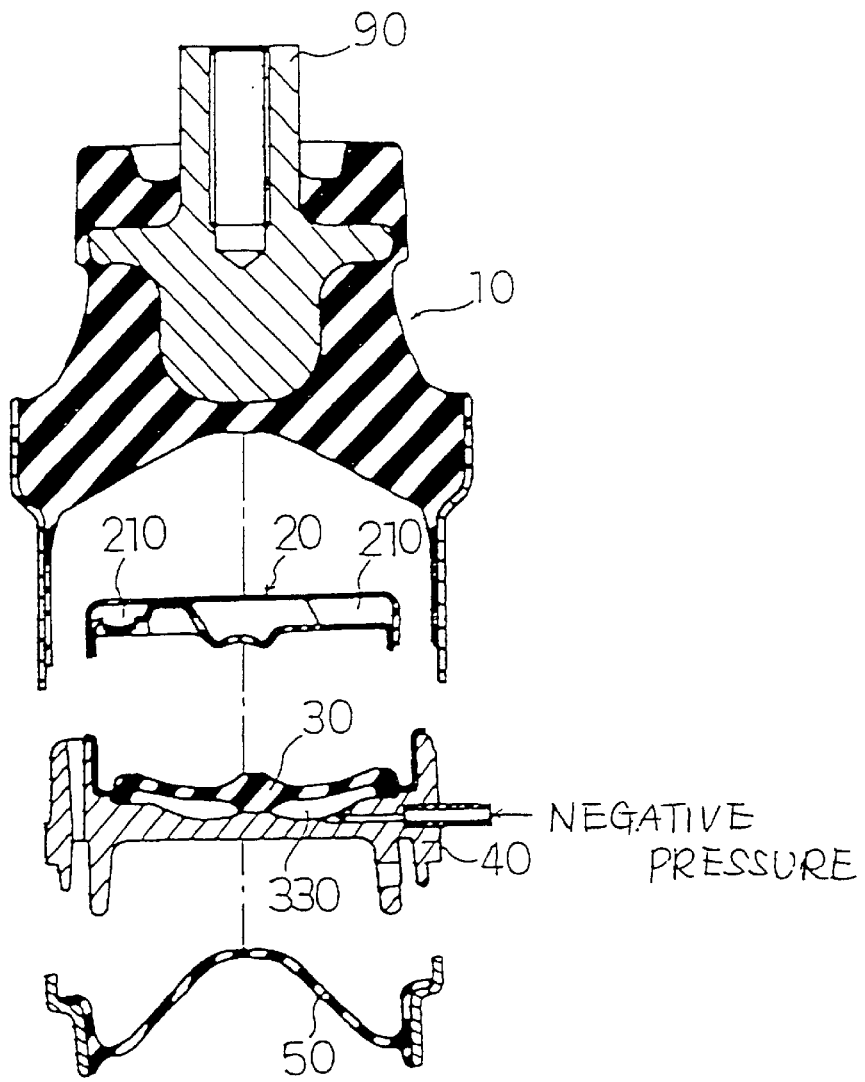
FIG. 7 is a development view showing the general configuration of a conventional one.

In this respect, in the present embodiment, the description has been made of a vibration isolator (See FIG. 1), in which the second orifice 12 and the first orifice 11, which are provided on the peripheral edge portion of the partitioning member 1, are formed in series to the main chamber 5, and in addition thereto, there is also such a vibration isolator as shown in FIG. 4, in which the first orifice 11 and the second orifice 12 are provided in parallel as shown in FIGS. 5 and 6. The basic configuration of this vibration isolator is the same as that of the series type which has been described so far. A difference is that openings 18, 19 of each orifice 11 and 12 on the side of the main chamber 5 are as shown in FIG. 4. In other words, they have openings 18, 19. The second orifice 12 has one end thereof coupled to the third liquid chamber 23, and the first orifice 11 communicates to the sub-chamber 6, and in other words, communicates to the sub-chamber-side opening 111.

Next, the description will be made of an operation or the like of a vibration isolator according to the present embodiment having such a configuration. That is, the vibration isolator according to the present embodiment is formed in a state in which each functional unit including two orifices 11 and 12 is integrally brought together at the above described partitioning member 1. Therefore, with such a partitioning member 1 as a basis, an insulator 4 made of a rubber-like member, or various diaphragms 2 and 7, further the lid member 3 or the like are installed around the partitioning member 1, thereby it becomes possible to comparatively simply form a negative pressure introduction type liquid-filled vibration isolator. Concretely, as shown in FIG. 2, within the recess 15 of the partitioning member 1, there is provided the second diaphragm 2, which will form a portion of the balance chamber 21, and on the upper portion side where the second diaphragm 2 has been provided, there is provided the lid member 3, which forms the third liquid chamber 23 and partitions with the main chamber 5, whereby a subassembly is formed, and around such a subassembly, there are installed a member having the rubber-like insulator 4, and further such first diaphragm 7 or the like as shown in FIG. 3. Thus, it becomes possible to comparatively simply form a liquid-filled type vibration isolator having a negative pressure introduction type vibration isolation mechanism.

Particularly, in a vibration isolator according to the present embodiment, the second orifice 12, which is an adjustment orifice corresponding to idling vibrations, is integrally formed on the peripheral edge portion of the partitioning member 1 in advance when castings made of aluminum alloy are molded. Therefore, there is no need for forming the second orifice 12 by a complicated sheet metal press molded object unlike the conventional one (See FIG. 5). Therefore, by fitting a lid member 3 having a simple shape into the upper opening 13 in the recess 15 of the cylindrical partitioning member 1 (See FIG. 2), the third liquid chamber 23, the second orifice 12, or the like will be formed. The center point of the circle (opening circle) of the opening 13 in the recess 15, into which the lid member 3 is fitted, has been set so as to be decentered by a predetermined amount from the center points of the circles to be formed by the above described both orifices 11 and 12, and therefore, it becomes possible to take the area of the lid member 3 large. Therefore, when the lid member 3 is provided with a rubber-like flexible member for coping with the input of vibrations within a high frequency area, it becomes possible to take the pressure-receiving area of the rubber-like flexible member large, and to effectively suppress an increase in the liquid pressure within the main chamber.

The description will be made of other embodiments according to the present invention. As an example of those embodiments, there is a case where, for example, characteristic properties of two orifices 11 and 12, that is, resonance frequencies (natural frequencies), which the respective orifices have, are set to close values to such a degree that they are affected by each other. In this case, an exciting force produced by the operation of the second orifice 12 and the third liquid chamber 23, which are shown in FIG. 2 or FIG. 3, is further amplified by the resonance operation of the first orifice 11, and this exciting force amplified propagates to the liquid within the main chamber 5 (See FIG. 1) through the second orifice 12. Accordingly, by the operation of the exciting force, an increase in the liquid pressure within the main chamber 5 is suppressed and it becomes possible to represent input of vibrations of a specific frequency by a low-moving spring constant. As described above, in a vibration isolator according to the present embodiment, the characteristic properties, which these two orifices have, are coupled with each other to thereby enhance the damping function of the input of vibrations of a specific frequency.

As another type vibration isolator which exhibits the above described coupled operation, there is a vibration isolator in which those two orifices do not communicate with each other, but are separately and independently formed respectively. This is a so-called parallel orifice type, in which liquid column resonance selectively occurs in orifices having a resonance frequency close to the input vibration frequency, and which has not control means and communicating path 81, which are used to introduce negative pressure and atmospheric pressure into the balance chamber. In a vibration isolator of this parallel orifice type, when tuning is made in a state in which the resonance frequency is brought close in such a manner that those separately-independent orifices are affected by each other, liquid movement occurs, although slightly, even in any other orifice than a resonant orifice, and by the liquid movement and a phase change, a greater vibration damping operation will be obtained than when an orifice tuned to a specific frequency is by itself used at the frequency. As described above, in a vibration isolator according to the present embodiment, the characteristic properties, which two orifices provided in parallel have, are caused to be coupled with each other to thereby make it possible to enhance the damping function with respect to the input of vibrations of a specific frequency.

In addition to the above described vibration isolator which exhibits the coupling operation, there is a vibration isolator, in which the functions of those two orifices are caused to be exhibited separately and independently. As regards this vibration isolator, in such a parallel type as shown in FIG. 4, under a specific condition such as when a vehicle is traveling, the above described negative pressure is introduced into the balance chamber 21 to cause the second diaphragm 2 to be always in a pulled state by negative pressure. This prevents fluctuations of the liquid pressure within the third liquid chamber 23 from occurring, and positively causes the liquid within the main chamber 5 to flow toward the sub-chamber 6 through the first orifice 11 against the input of vibrations to the liquid within the main chamber 5. As a result, high damping characteristics will be obtained and vibrations of the specific frequency such as engine shakes will be able to be damped and isolated. Conversely, with respect to input of a specific vibration such as idling vibration, the balance chamber 21 is caused to be in an atmospherically-opened state to hold the second diaphragm 2 and the third liquid chamber 23 in a freely-vibration state. This causes the liquid within the second orifice 12 and the third liquid chamber 23 to resonate against the input of idling vibrations to the liquid within the main chamber 5 to represent input of vibration of a specific frequency such as the idling vibration by a low-moving spring constant.

According to the present invention, there is provided a liquid-filled type vibration isolator of a type having two orifices, configured by: a first coupling member to be mounted to a vibration member; a second coupling member to be mounted to a vehicle body-side member or the like; a rubber-like insulator interposed between these first and second coupling members, for absorbing and isolating vibrations from the vibration member; a main chamber, whose chamber walls are formed by a portion of the insulator concerned, and which is filled with liquid; a sub-chamber, whose chamber walls are partially partitioned and formed by the first diaphragm, coupled to the main chamber concerned through the first orifice; a partitioning member for partitioning between the main chamber and the sub-chamber; a second orifice for coupling the main chamber to a third liquid chamber; or the like, in which the above described partitioning member is configured such that it has a cylindrical shape, has the first and second orifices on its peripheral edge portion, has, on the upper portion side, an opening to be formed independently of the first and second orifices, has a recess, whose bottom portion forms a partition with the sub-chamber, and further has, on its lower portion side, an opening of the first orifice connected to the sub-chamber. Therefore, the vibration isolator is to be formed in a state in which each functional unit including two orifices is integrally brought together at the above described partitioning member, and with such a partitioning member as a basis, an insulator made of a rubber-like member, various diaphragms or the like are installed around the partitioning member, whereby it becomes possible to comparatively simply form a liquid-filled type vibration isolator of the type having two orifices.

Furthermore, according to the present invention, a liquid-filled type vibration isolator is configured such that within the recess of the cylindrical partitioning member, there is provided the second diaphragm, which forms a portion of the third liquid chamber, and on the upper portion side in which the second diaphragm has been provided, there is provided a lid member having a simple shape, which forms the third liquid chamber and partitions with the main chamber. Therefore, it has become possible to integrally form a vibration isolation mechanism with the partitioning member as the basis. The vibration isolation mechanism comprises the second diaphragm, the third liquid chamber for adjusting the liquid pressure within the main chamber by the operation of the second diaphragm, the second orifice or the like. Therefore, there is no need for forming the second orifice by a complicated press molded object or the like, but it has been possible to reduce the manufacturing cost as a whole.

What is claimed is:

1. A liquid-filled type vibration isolator having two orifices, a partitioning member, a lid member, a first and second diaphragm, and a first diaphragm fixing member, comprising:

a first coupling member to be mounted to a vibration member;

a second coupling member to be mounted to a vehicle body-side member;

an insulator, interposed between these first coupling member and second coupling member, for absorbing and isolating vibrations from said vibration member;

a main chamber having a chamber wall comprising a portion of the insulator, a portion of the lid member, and a portion of the partitioning member, the main chamber being filled with a liquid;

a sub-chamber, whose chamber wall comprising a portione of the first diaphragm and a portion of the partitioning member;

wherein the partitioning member separates the main chamber and the sub-chamber and has a generally cylindrical shape;

and wherein the first orifice and the second orifice provide for communication between the main chamber, the sub-chamber and a third liquid chamber, the first and second orifices being substantially circular and having center points;

and wherein the partitioning member further comprises
      a peripheral portion, the first orifice being defined by a lower side groove portion of the peripheral portion and an inner wall portion of the first diaphragm fixing member and the second orifice being defined by an upper side groove portion on the peripheral portion and an inner wall portion of the insulator,
      an upper portion side, a third opening and a recess being formed on the upper portion side, the recess being substantially circular and having a center point, and
      a lower portion side, an opening of the first orifice connected to said sub-chamber on the lower portion side;

and further comprising
      the second diaphragm positioned within the recess of the partitioning member to thereby form a portion of the third liquid chamber,
      the lid member being fitted within the recess and above the second diaphragm to thereby form a portion of the third liquid chamber and partition the third liquid chamber from the main chamber;
      and further wherein the center point of the recess, into which the lid member is fitted, and offset by a predetermined amount from the center points of the first and second orifices.

2. The liquid-filled type vibration isolator according to claim 1,
   wherein said second orifice is formed by an upper side groove portion of said partitioning member and an inner wall portion of said insulator, and said first orifice is formed by a lower side groove portion of said partitioning member and an inner wall portion of said first diaphragm fixing member.

3. The liquid-filled type vibration isolator according to claim 2,
   wherein said second orifice and said first orifice are provided in series to said main chamber.

4. The liquid-filled type vibration isolator according to claim 2,
   wherein said first orifice and said second orifice are provided in parallel to said main chamber.

5. The liquid-filled type vibration isolator according to claim 1,
   wherein said second orifice is formed by an upper side groove portion of said partitioning member and an inner wall portion of said insulator, and said first orifice is formed by a lower side groove portion of said partitioning member and an inner wall portion of said first diaphragm.

6. The liquid-filled type vibration isolator according to claim 5,
   wherein said second orifice and said first orifice are provided in series to said main chamber.

7. The liquid-filled type vibration isolator according to claim 5,
   wherein said first orifice and said second orifice are provided in parallel to said main chamber.

8. The liquid-filled type vibration isolator according to claim 1,
   wherein said first orifice and said second orifice are provided in series to said main chamber.

9. The liquid-filled type vibration isolator according to claim 1,

10. The liquid-filled type vibration isolator according to claim 1, wherein said second orifice is formed by an upper side groove portion of said partitioning member and an inner wall portion of said insulator, and said first orifice is formed by a lower side groove portion of said partitioning member and an inner wall portion of said first diaphragm.

11. The liquid-filled type vibration isolator according to claim 10,
   wherein said second orifice and said first orifice are provided in series to said main chamber.

12. The liquid-filled type vibration isolator according to claim 10,
   wherein said first orifice and said second orifice are provided in parallel to said main chamber.

13. The liquid-filled type vibration isolator according to claim 1, thereby a vibration isolation mechanism comprising said second diaphragm, said third liquid chamber for adjusting the liquid pressure within said main chamber by the operation of said second diaphragm concerned, and said second orifice, is caused to be integrally formed with said partitioning member as the basis.

14. The liquid-filled type vibration isolator according to claim 13,
   wherein said second orifice is formed by an upper side groove portion of said partitioning member and an inner wall portion of said insulator, and said first orifice is formed by a lower side groove portion of said partitioning member and an inner wall portion of said first diaphragm fixing member.

15. The liquid-filled type vibration isolator according to claim 14,
   wherein said second orifice and said first orifice are provided in series to said main chamber.

16. The liquid-filled type vibration isolator according to claim 14,
   wherein said first orifice and said second orifice are provided in parallel to said main chamber.

17. The liquid-filled type vibration isolator according to claim 13,
   wherein said second orifice is formed by an upper side groove portion of said partitioning member and an inner wall portion of said insulator, and said first orifice is formed by a lower side groove portion of said partitioning member and an inner wall portion of said first diaphragm.

18. The liquid-filled type vibration isolator according to claim 17,
   wherein said second orifice and said first orifice are provided in series to said main chamber.

19. The liquid-filled type vibration isolator according to claim 17,
   wherein said first orifice and said second orifice are provided in parallel to said main chamber.

* * * * *